US009888024B2

(12) United States Patent
Roundy et al.

(10) Patent No.: US 9,888,024 B2
(45) Date of Patent: Feb. 6, 2018

(54) DETECTION OF SECURITY INCIDENTS WITH LOW CONFIDENCE SECURITY EVENTS

(71) Applicant: Symantec Corporation, Mountain View, CA (US)

(72) Inventors: Kevin Roundy, El Segundo, CA (US); Michael Spertus, Chicago, IL (US)

(73) Assignee: SYMANTEC CORPORATION, Mountain View, CA (US)

( * ) Notice: Subject to any disclaimer, the term of this patent is extended or adjusted under 35 U.S.C. 154(b) by 114 days.

(21) Appl. No.: 14/871,643

(22) Filed: Sep. 30, 2015

(65) Prior Publication Data

US 2017/0093902 A1    Mar. 30, 2017

(51) Int. Cl.
*H04L 29/06* (2006.01)
*G06F 21/55* (2013.01)
*H04L 12/24* (2006.01)

(52) U.S. Cl.
CPC ........ *H04L 63/1433* (2013.01); *G06F 21/552* (2013.01); *G06F 21/554* (2013.01); *H04L 63/1416* (2013.01); *H04L 63/1425* (2013.01); *H04L 41/0604* (2013.01)

(58) Field of Classification Search
CPC ..... H04L 63/00; H04L 63/14; H04L 63/1408; H04L 63/1416; H04L 63/1425; H04L 63/1433; H04L 63/145; H04L 63/1466; H04L 63/20; G06F 21/50; G06F 21/55; G06F 21/552; G06F 21/56; G06F 21/561
See application file for complete search history.

(56) References Cited

U.S. PATENT DOCUMENTS

| 7,644,438 | B1* | 1/2010 | Dash ................... H04L 63/0218 703/17 |
| 8,079,083 | B1* | 12/2011 | Bennett ............... H04L 63/1416 726/23 |
| 8,423,894 | B2 | 4/2013 | Bhattacharya et al. |
| 8,613,083 | B1* | 12/2013 | Njemanze ........... H04L 63/0218 709/223 |
| 8,739,290 | B1 | 5/2014 | Jamail et al. |
| 2007/0180107 | A1* | 8/2007 | Newton .............. H04L 63/1425 709/224 |
| 2008/0168531 | A1* | 7/2008 | Gavin ................. H04L 63/1408 726/1 |
| 2012/0096549 | A1* | 4/2012 | Amini ................. H04L 63/1433 726/23 |

(Continued)

*Primary Examiner* — Eric W Shepperd
(74) *Attorney, Agent, or Firm* — Patterson + Sheridan, LLP

(57) ABSTRACT

Techniques are disclosed for detecting security incidents based on low confidence security events. A security management server aggregates a collection of security events received from logs from one or more devices. The security management server evaluates the collection of security events based on a confidence score assigned to each distinct type of security event. Each confidence score indicates a likelihood that a security incident has occurred. The security management server determines, based on the confidence scores, at least one threshold for determining when to report an occurrence of a security incident from the collection of security events. Upon determining that at least one security event of the collection has crossed the at least one threshold, the security management server reports the occurrence of the security incident to an analyst.

19 Claims, 7 Drawing Sheets

(56) References Cited

U.S. PATENT DOCUMENTS

| | | | | |
|---|---|---|---|---|
| 2012/0159267 A1* | 6/2012 | Gyorffy | ............. | G06F 11/0709 |
| | | | | 714/55 |
| 2012/0180103 A1* | 7/2012 | Weik, III | ............... | G06Q 10/00 |
| | | | | 726/1 |
| 2012/0260306 A1* | 10/2012 | Njemanze | .............. | G06Q 10/06 |
| | | | | 726/1 |
| 2013/0243190 A1* | 9/2013 | Yang | .................... | H04L 9/0816 |
| | | | | 380/44 |
| 2013/0318604 A1* | 11/2013 | Coates | ................ | H04L 63/1416 |
| | | | | 726/22 |
| 2015/0356445 A1* | 12/2015 | Lingafelt | ............ | H04L 41/0604 |
| | | | | 706/47 |
| 2016/0019388 A1* | 1/2016 | Singla | ................... | G06F 21/552 |
| | | | | 726/23 |
| 2016/0065610 A1* | 3/2016 | Peteroy | .............. | H04L 63/1441 |
| | | | | 713/153 |
| 2016/0103992 A1* | 4/2016 | Roundy | ................ | G06F 21/554 |
| | | | | 726/23 |
| 2016/0135706 A1* | 5/2016 | Sullivan | .............. | A61B 5/0059 |
| | | | | 600/301 |

* cited by examiner

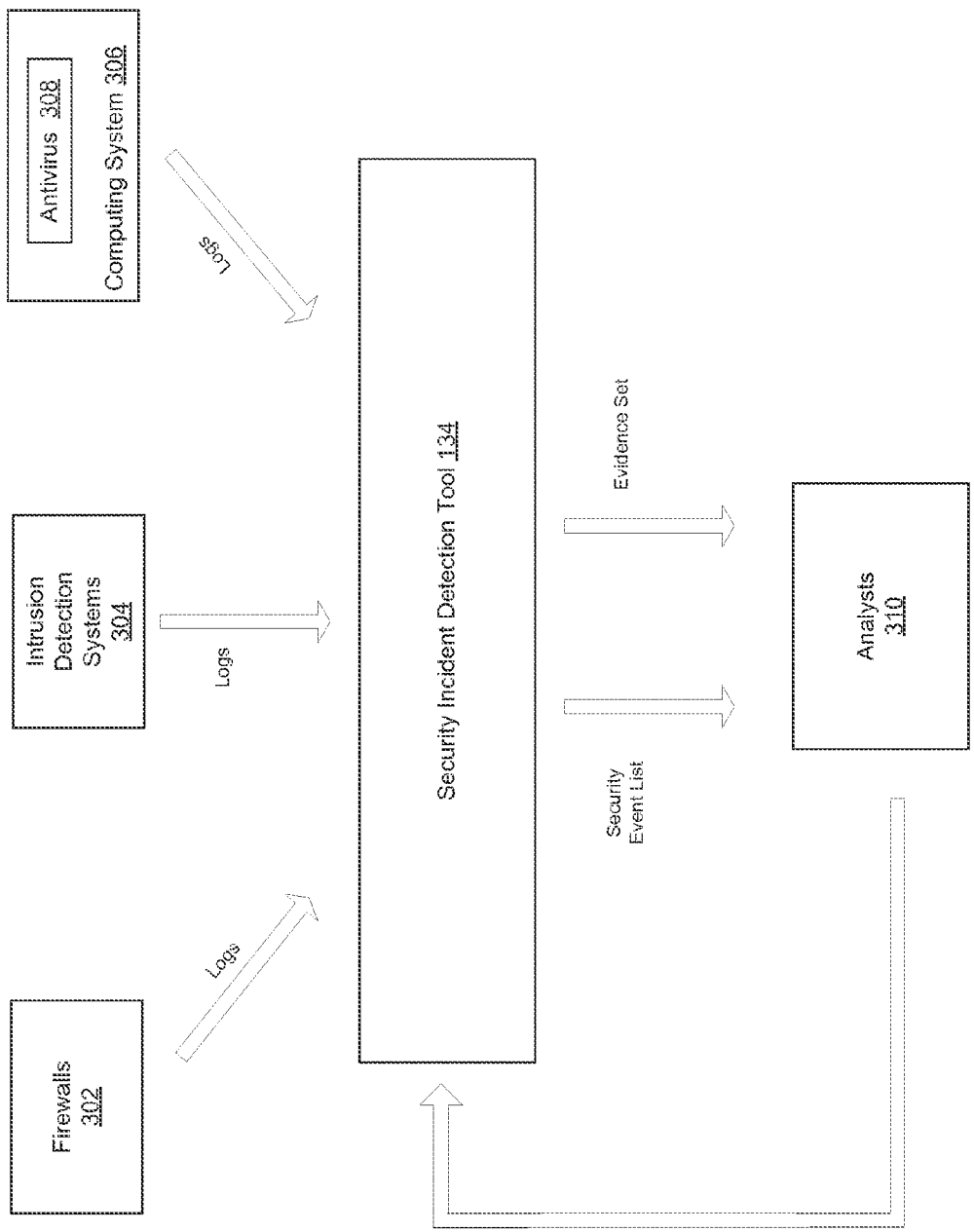

MONITORING INTERFACE

Security Event List

| Event ID | Confidence | Signature Name |
|---|---|---|
| 109013 | 0.89 | HTTP IIS ISAPI Extension (Code Red) |
| 108844 | 0.85 | HTTP Htgrep CGI File Access |
| 114207 | 0.78 | HTTP Hylafax Faxsurvey Remote PW Access |
| 93388 | 0.52 | HTTP CGI NPH Request |
| 114205 | 0.52 | HTTP Anaconda Directory Traversal |
| 108843 | 0.50 | Attack: HTTP hidlg File Disclosure CVE-2000-0208 |
| 254463 | 0.25 | HTTP Crystal Rpts Form Viewer Traversal |
| 700303 | 0.03 | PIX-6-302015 |
| 94799 | 0.00 | Service Stopped |

Evidence Set

| Event ID | ConfOccurRate | Signature Name |
|---|---|---|
| 1420504 | 0.35 | OS Attack: MSRPC Server Service RPC CVE-2008-4250 2 |
| 312559 | 0.34 | OS Attack: MSRPC Server Service RPC CVE-2008-4250 2 |
| 95352 | 0.20 | OS Attack: MSRPC Server Service RPC CVE-2008-4250 2 |
| ••• | ••• | ••• |

FIGURE 4

DETECTION OF SECURITY INCIDENTS WITH LOW CONFIDENCE SECURITY EVENTS

BACKGROUND

Field

Embodiments presented herein generally relate to techniques for managing security events, and more specifically, to techniques for detecting security incidents based on low confidence security events.

Description of the Related Art

Many enterprises (e.g., individuals, organizations, companies, etc.) employ some form of network security solution to help combat and/or prevent security threats. In some cases, for example, enterprises increasingly rely on outside security services (e.g., such as managed security service providers (MSSPs), and the like) to provide specialized computer and network services and/or employ security management tools (e.g., such as security incident and event managers (SIEMs), etc.) to help manage enterprise security operations. The increased use of MSSPs and SIEMs is due, in part, to increased costs associated with large computing infrastructures, a lack of security expertise, resource constraints, etc. For example, enterprise computing infrastructures typically include many computing systems, applications, networks, data storage system, etc., that are constantly subject to a wide variety of security threats and vulnerabilities. Further, enterprise computing infrastructures often employ a variety of security tools (e.g., firewalls, antivirus software, intrusion detection systems, intrusion prevention systems, etc.) to monitor computing systems and infrastructure. As a result, enterprises employ outside security services and/or security management tools to help monitor, detect, and prevent security threats.

Outside security services (such as MSSPs, etc.) can provide a portion or all of a client's security needs. Examples of typical functions performed by outside security services include: gathering, analyzing and presenting (to an analyst) information gathered from network and security devices; installing, managing, and/or upgrading network security equipment (e.g., firewalls, intrusion detection software, etc.); performing vulnerability scans; and other similar services. In some cases, SIEMs can be used by enterprises and/or MSSPs to help perform one or more of these functions. SIEMs, in general, are tools that aggregate product telemetry, usually from multiple vendors, into a common format to centralize security-related data and facilitate the creation of detection rules. Most SIEMs are managed by the enterprise's incident responders (e.g., security analysts), who create rules and monitor the system output to identify security incidents. However, in some cases, MSSPs can also use SIEMs to perform security incident detection. For example, in these cases, MSSPs can validate the output from SIEMs and then alert the enterprise's security analysts to a security incident.

In order to perform these network services, MSSPs and/or SIEMs typically have to collect and process huge amounts of information. For example, to detect security incidents, MSSPs and/or SIEMs generally have to process hundreds of thousands of types of security events and rely on manually-created rules to detect a security incident. These security incidents are then presented to security administrators, which are typically tasked with deciding whether to handle or resolve the security incidents. However, performing security incident detection in this manner often leads to many false-positive incidents. These false-positive incidents, when presented to security administrators, can overwhelm administrators with unnecessary and unhelpful information, and distract them from real security threats, which may in turn leave enterprise network systems vulnerable to attacks.

SUMMARY

One embodiment presented herein describes a method for detecting security incidents based on low confidence security events. The method generally includes aggregating a collection of security events received from logs from one or more devices. The method also includes evaluating the collection of security events based on a confidence score assigned to each distinct type of security event, wherein the confidence for each distinct type of security event indicates a likelihood that a security incident has occurred. The method further includes determining, based on the confidence scores, at least one threshold for determining when to report an occurrence of a security incident from the collection of security events. The method further yet includes, upon determining that at least one security event of the collection has crossed the at least one threshold, reporting the occurrence of the security incident to an analyst.

Another embodiment includes a system having a processor and a memory storing a program, which, when executed on the processor, performs an operation for detecting security incidents based on low confidence security events. The operation includes aggregating a collection of security events received from logs from one or more devices. The operation also includes evaluating the collection of security events based on a confidence score assigned to each distinct type of security event, wherein the confidence for each distinct type of security event indicates a likelihood that a security incident has occurred. The operation further includes determining, based on the confidence scores, at least one threshold for determining when to report an occurrence of a security incident from the collection of security events. The operation further yet includes, upon determining that at least one security event of the collection has crossed the at least one threshold, reporting the occurrence of the security incident to an analyst.

Still another embodiment includes a computer-readable storage medium storing instructions, which, when executed on a processor, performs an operation for detecting security incidents based on low confidence security events. The operation includes aggregating a collection of security events received from logs from one or more devices. The operation also includes evaluating the collection of security events based on a confidence score assigned to each distinct type of security event, wherein the confidence for each distinct type of security event indicates a likelihood that a security incident has occurred. The operation further includes determining, based on the confidence scores, at least one threshold for determining when to report an occurrence of a security incident from the collection of security events. The operation further yet includes, upon determining that at least one security event of the collection has crossed the at least one threshold, reporting the occurrence of the security incident to an analyst.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be

FIG. 3 illustrates an example of the security incident detection tool incorporating analyst feedback, according to one embodiment.

FIG. 4 illustrates an example report showing a security event list and set of evidence for a security incident, according to one embodiment.

DETAILED DESCRIPTION

Figure 1:
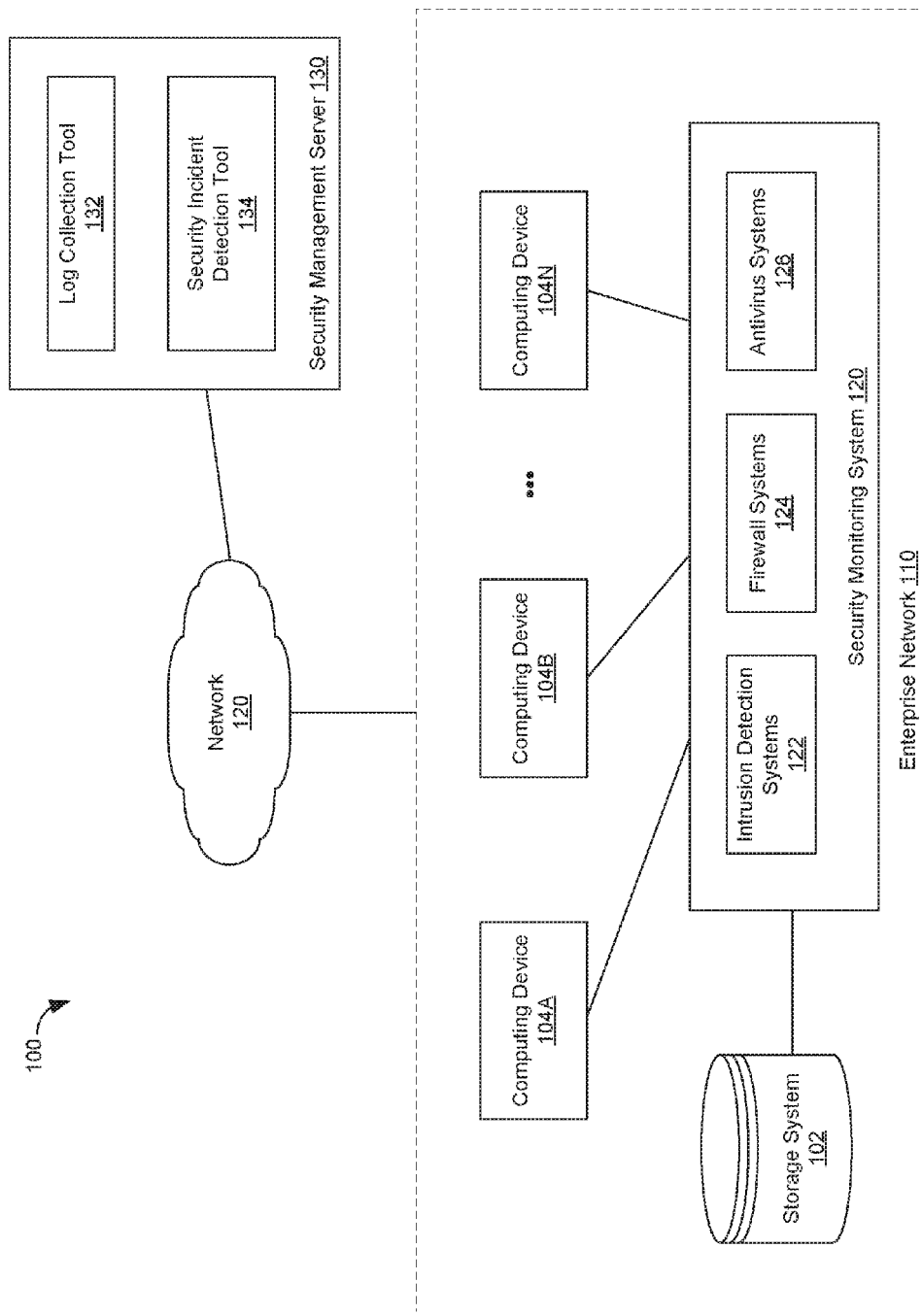
FIG. 1 illustrates an example computing environment, according to one embodiment.

Today, many organizations employ systems that are capable of generating security events. Examples of these systems include firewalls, authentication systems, network intrusion detection and prevention systems, host-based intrusion detection systems, virtual private network (VPN) devices, wireless security devices, anti-virus systems, anti-malware systems, and others. As used herein, a security event generally refers to an observable change in operation of a network, system, or service that indicates that security may have been breached or comprised, a security policy may have been violated, and/or a security safeguard may have failed. A security incident is generally made up of one or more unwanted or unexpected security events that have the potential to compromise security and/or impair the operation of a system.

Around the clock monitoring of an organization's systems can result in large amounts of security events that MSSPs, SIEMs, and other security solutions have to process in order to determine whether any of the security events are indicative of a security incident. Most of these security events, however, are increasingly behavioral and contextual in nature, and may convey some risk, but are not black and white in terms of indicating an actual security incident (e.g., a vulnerability, infected machine, attack, etc.).

Embodiments presented herein describe techniques for detecting security incidents that should be investigated based on low confidence security events. A low confidence security event generally refers to a security event that conveys low risk of a security incident (e.g., such as an infection, vulnerability, attack, etc.) and that does not merit investigation individually. In one embodiment, a security management server receives security logs from devices in a computing network. For example, devices, which can generate security logs evaluated by the security management server, include network devices, security devices, applications, databases, etc. Each security log may provide data associated with a heterogeneous collection of one or more different types of security events. Examples of these different types of security events include authentication events, audit events, intrusion events, anti-virus events, etc.

In one embodiment, the security management server aggregates, for a period of time, different types of security events and computes a confidence score for each security event. The security management server can use machine learning techniques (e.g., with a set of ground truth events that correlate to an incident) to determine the confidence scores. The confidence score for a given security event generally represents a collection of data that can be used to estimate the effect that the occurrence of that event in a given context has on the security status of an entity. For example, the confidence score could represent a measure of the percentage of time the particular security event has occurred in the context of a true-positive security incident. The data in a confidence score can reference any context available to the security management server. Such context can include what events precede the security event or patch, vulnerability, configuration data of the device being monitored, intelligence data about the fields of an event (e.g., such as reputation of an IP or URL), and the like. The security management server then determines, based on the confidence scores, a set of thresholds for detecting a security incident from the security events. For example, as described below, the security management server uses the thresholds to determine when to escalate a given set of security events from the logs, any of which do not merit investigation individually, to the level of a security incident that should be investigated.

In one embodiment, the security management server employs different diversity metrics and/or machine learning techniques to determine the thresholds. For example, the security management server uses the diversity metrics to evaluate the combination of different types of low confidence security events, which can be generated from different devices (or systems). The information from the diversity metrics can then be used with machine learning techniques to generate thresholds, which the security management server uses to determine when to elevate a set of different low confidence security events, which otherwise might be ignored, to the level of a security incident that should be investigated (e.g., by a system analyst). In one embodiment, the security management server can also develop a set of evidence that can be used to support a detected security incident.

In one embodiment, once a security incident is detected (e.g., using the thresholds, etc.), the security management server provides a system analyst with a list of the security events associated with the security incident, along with the evidence that supports each security event. Once the security management server receives an indication of the type of feedback (e.g., a response, no response, etc.) from the analyst, the security management server re-fines at least one of the set of thresholds or the evidence set, based on the type of analyst feedback.

Traditional techniques for detecting security incidents generally rely on manually created rules based on high-confidence security events, while lower-confidence events are generally used to provide context. Such approaches, however, are not capable of detecting a security incident based on security events that are low-confidence (and therefore, convey low risk of a security incident). For example, with the use of traditional techniques, these type of security events may seem benign (e.g., because they are not high-confidence events), however, when these low-confidence security events are taken into context with other security events (which may or may not be high-confidence events), they can actually be indicative of a true-positive security incident (e.g., an infected machine).

Further, traditional security incident detection techniques are inflexible and unresponsive to the constant changing nature of security events. For example, most traditional techniques generally focus on measuring anomalous levels of individual events of a single type, but are not capable of analyzing a heterogeneous collection of security events which can come from several different types of machines. In addition, SIEMs, MSSPs, and the like generally process hundreds of thousands of types of security events that are constantly being updated to deal with new threats. Newly introduced events may be of high confidence, but rule-based approaches relying on manual effort typically result in these new high-confidence security events being ignored until an analyst eventually recognizes them as such and creates rules to incorporate them.

Furthermore, in many cases, SIEMs, MSSPs, etc. are faced with so many noisy alerts of extremely low confidence that the background level of low-confidence events is generally only twenty percent lower than the event volume during an actual security incident. As a result, in such a noisy environment, the use of traditional techniques tends to produce numerous false-positive security incidents, which when presented to human analysts, can overburden and distract the analysts from real security threats.

Embodiments presented herein provide techniques that can automatically detect infected machines, vulnerabilities, attacks, and other security incidents by leveraging confidence labels applied to security events (or alerts). A confidence label can be provided by any system capable of labeling diverse collections of events with confidence scores. As described below, techniques presented herein can be used to eliminate low-confidence alerts that have negligible ability to detect infected machines. Doing so may eliminate a large amount of noise, as the most frequent events observed are those of near-zero confidence. With these events out of the way, the techniques presented herein can be used to detect high-confidence events based on nearly any measure of the security event diversity that happens in a fixed-time window.

In addition, the techniques presented herein can improve classification accuracy (e.g., of security incidents) by incorporating additional confidence based metrics into a threshold-based anomaly-detection model. Further, the techniques presented herein are capable of justifying (through evidence) each detected security incident, which allows analysts to fine-tune the system (e.g., in real-time, in some examples) by adjusting signature confidence scores through a feedback loop mechanism.

Note that, in the following description, many of the following embodiments are described using security events received from security devices, such as firewalls, intrusion detection systems, anti-virus systems, etc., as reference examples of some of the different types of systems that can used with the techniques described herein. One of ordinary skill in the art, however, will recognize that the embodiments presented herein may be adapted to work with a variety of computing devices, such as those used for security monitoring, communication, data storage, cloud computing, etc.

FIG. 1 illustrates an example computing environment 100, according to one embodiment. As shown, the computing environment 100 includes an enterprise network 110 connected to a security management server (SMS) 130 via a network 120. The network 120, in general, may be a wide area network (WAN), local area network (LAN), wireless LAN (WLAN), etc. In a particular embodiment, the network 120 is the Internet.

As shown, the enterprise network 110 includes one or more computing devices 104A-N, a security monitoring system 120 and a storage system 102. In one embodiment, the storage system 102 is a database. Each one of the computing devices 104A-N can be any kind of physical computing system having a network interface such as a desktop computer, laptop computer, mobile device, tablet computer, server (e.g., web server, authentication server, DNS server, mail server, etc.), customer premises equipment (e.g., routers, switches, gateways, and the like), etc.

Within enterprise network 110, the security monitoring system 120 is configured to monitor computing devices 104A-N (and other systems in enterprise network 110) for security events. The security monitoring system 120 includes a plurality of security devices, such as intrusion detection systems 122, firewall systems 124, and anti-virus systems 126 for detecting security events within enterprise network 110. Each security event that is detected may indicate activity related to an attempt to attack, comprise, or otherwise disrupt the operation of computing devices 104A-N. Examples of the different types of security events include, but are not limited to, authentication events (e.g., attempting to read a password file, etc.), (host or network based) intrusion events, network traffic events, anti-virus events (e.g., detecting malware infection), etc. Once the security monitoring systems 120 identifies a security event, the security event can be stored in any form (e.g., such as in system logs, security logs, etc.) within storage system 102.

As mentioned above, most organizations perform around-the-clock monitoring of their computing devices/systems (e.g., such as those within enterprise network 110). As a result, in any given time period, the security monitoring system 120 is capable of producing a vast amount of security events. Given the large number of security events that can occur in an enterprise computing system for any given time period, most organizations typically use MSSPs, SIEMs, etc. (e.g., such as SMS 130, in this example) to help monitor, detect and/or analyze security events.

As shown, the SMS 130 includes a log collection tool 132, which is configured to collect security events stored in logs from the devices and systems within enterprise network 110. The logs can come from any of the computing devices 104A-N, storage system 102, security systems (e.g., intrusion detection systems 122, firewall systems 124, and anti-virus systems 126, etc.) within security monitoring system 120, and the like. The SMS 130 also includes security incident detection (SID) tool 134, which is configured to perform the techniques presented herein. For example, the SMS 130 is capable of performing operations 500 in FIG. 5, operations 600 in FIG. 6, or any of the techniques (or combination of techniques) described herein. For example, as described below, the SID tool 134 is capable of providing more high-confidence security alerts (e.g., compared to traditional techniques) based on an aggregation of different types of security events, each of which can be a low-indicator (e.g., low confidence) of a security incident.

To convince an analyst that a particular detected security incident is a real incident and that the analyst needs to take action, the SID tool 134 is configured to justify the incident by generating and reporting a set (or list) of evidence that supports each security event identified for the particular incident. For example, as will be described with reference to FIG. 4, once the SID tool 134 identifies a security incident, the SID tool 134 displays a list of security events that occurred during the security incident and that are associated with the security incident. In addition to the list of security events, the SID tool 134 also provides a list of events that are most associated with the security events in the incident. This additional list of events did not occur during the security incident, but are a set of events that correlate with activity that indicates a likelihood that an infection has occurred. In some examples, the set of evidence could include one or more login attempts, password file access attempts, file system updates, local file corruptions, and other any other information that reliability indicates suspicious activity and/or that an administrator would want to know about. In some examples, the set of evidence could also include events that correlate with successful infections, vulnerabilities or attacks.

For example, in one case, for any security event in the identified incident, the evidence set could indicate the percentage of time the event occurred in the context of a security incident (e.g., 80% of the time that security event triggers, it is associated with an OS Attack), and the name of the particular security incident. In one embodiment, the SID tool 134 can provide an evidence set that shows a security event's correlation with other security events that reliably trigger the creation of an incident. For example, in this case, for any security event in the identified incident, the evidence set could indicate the percentage of time the event occurred in the context of another security event (e.g., 60% of the time the security event co-occurs with an Apache web server buffer overflow, 30% of the time the security event co-occurs with "system.infected.3234," 15% of the time, the security event co-occurs with "Artemis!2384917," 5% of the time the security event co-occurs with "outbound ZeroAccess traffic," and so on). Doing so in this manner allows human analysts to easily understand security incidents, so that human analysts can readily judge whether the incident is real, and whether to take action on the incident. Further, reporting such information provides the analyst with a chance to incorporate feedback as to which elements really belong in the evidence set, which allows SSPs to improve security incident detection, reduce the number of false-positive incidents, etc.

For example, in some embodiments, the SID tool 134 is configured to incorporate analyst feedback (or, in some cases, the lack of feedback) to determine whether to modify the events listed in the evidence set, improve security incident detection technique, etc. For example, as also described below, once the SID tool 134 alerts the analyst with a given security incident, provides a list of the security events associated with the incident, and provides an evidence set associated with each of the security events in the list, the SID tool 134 can determine whether or not to modify the evidence set (e.g., add/delete/modify items in the set) based on whether the analyst responds (and if so, the type of response).

Note, however, that FIG. 1 illustrates merely one possible arrangement of the computing environment 100. For example, although some of the security systems are illustrated separately from the computing devices 104A-N, in some embodiments, one or more of the security systems could be within the computing devices 104A-N. More generally, one of ordinary skill in the art will recognize that other embodiments of the computing environment 100 can also be configured to provide high-confidence detection of security incidents based on an aggregation of low-confidence security events.

Figure 2:
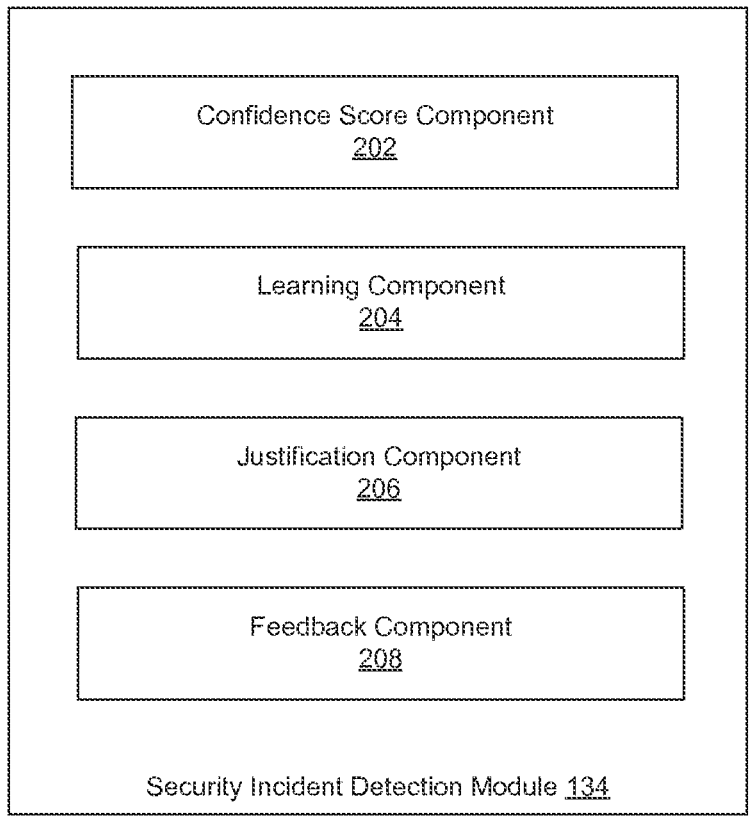
FIG. 2 illustrates an example tool configured to detect security incidents based on low confidence security events, according to one embodiment.

FIG. 2 further illustrates an example of the SID tool 134 described relative to FIG. 1, according to one embodiment. As shown, the SID tool 134 includes a confidence score component 202, a learning component 204, a justification component 206, and a feedback component 208. In one embodiment, once the log collection tool 132 collects logs from computing devices 104A-N, the confidence score component 202 aggregates security events over a fixed time window (e.g., on the order of minutes, hours, days, etc.), and computes confidence scores for each of the identified security events.

Each confidence score, in general, is a measure of the percentage of the time the respective security event occurred in the context of an infection, attack, vulnerability, etc. Using the reading of a password file as a reference example of one type of security event, if one of the security systems were to log this type of security event, the confidence score component 202 would first determine the number of password file attempts that occurred during the fixed time window. The confidence score component 202 would then determine the number of times during the fixed time window the security event occurred (e.g., a certain time before and/or after) in the context of an infection. Based on this information, the confidence score component 202 could then compute a confidence score for the reading of a password file. For example, using the above example, if the reading of a password file occurred 10,000 times in one day, and of those 10,000 times, the security event occurred 8,000 times when anti-virus software (on a host device) indicated there was an infection, the confidence score component 202 would compute a confidence score of 0.8. In this manner, the confidence score component 202 can compute confidence scores for a diverse collection of security events.

In one embodiment, once the confidence score component 202 computes confidence scores for each type of security event, the confidence score component 202 evaluates the security events (and their respective confidence scores) using a plurality of diversity metrics. One such type of metric is based on the sum of confidence scores. For example, in one case, the confidence score component 202 can employ a metric that measures the sum of the confidence score of each security event type that triggered during the fixed time window. Rather than focus on the number of occurrences of any one type of security event, this metric instead counts each type of security event only once (no matter how many times the security event occurred during the fixed time window). For example, if a security event of type 1 (with a confidence score of 0.01) occurred one million times and a security event of type 2 (with a confidence score of 0.5) occurred one hundred times, this metric would indicate a confidence sum score of 0.51.

In one example, the confidence score component 202 can use a metric that measures the log of the sum of the confidence score for each instance of each event that triggered during the time window. Compared to the above metric (which ignored the number of instances of any one particular security event type), this metric takes into account the number of instances of a security event and may indicate a percent likelihood that a security incident has occurred based on the sheer volume of instances. For example, the log is used because the alert volume can frequently range into 10's of millions of security events in a day.

Another type of metric includes metrics based on the type of security event. For example, in one case, the confidence score component 202 can use a metric that measures the total number of different event types that triggered during the time period (e.g., disregarding the number of instances of a particular event type). In one case, the confidence score component 202 can employ a metric that only considers the number of anti-virus security events. Metrics based solely on anti-virus events can be helpful (for security incident detection) because anti-virus events typically are more reliable indicators of security incidents and, in general, are rarer than network events. As such, metrics that focus more on anti-virus events can be used by the confidence score component 202 when determining thresholds for security incident detection and/or a set of evidence. In addition, metrics based on anti-virus events can also incorporate the sum of confidence scores, log of the sum of confidence scores, etc., similar to the metrics described above.

Other types of metrics that can be used by the confidence score component include, but are not limited to, metrics based on the maximum confidence score held by any one security event that triggered during the fixed time window, metrics based on the number of different security devices that contributed to the detection (e.g., if an antivirus device and a network device were involved, there would be a broader and stronger indication of a security incident), and others. Note that the diversity metrics described above are provided as reference examples of metrics that can be used to evaluate the different types of security events which can come from different devices. In general, however, the confidence score component 202 can use any one (or combination) of the above metrics or other similar metrics to evaluate the security events.

In one embodiment, once the confidence score component 202 computes confidence scores for each security event and evaluates the security events using one or more diversity metrics, the confidence score component 202 provides the information (e.g., security events, confidence scores, analysis information from the metrics, etc.) to a human analyst, who can generate a set of manual thresholds (e.g., in the event there is no ground truth set). Alternatively, in another embodiment, if there is a ground truth set available, the confidence score component 202 provides the information to the learning component 204, which inputs the information into a machine learning algorithm in order to train a security incident detection model. For example, in one particular embodiment, the learning component 204 can employ a support vector machine (SVM), which defines the linear combination of features that best separates known incidents from false positive alert identifications. In many cases, using a SVM model may be beneficial for a big-data environment, because the SVM is easily defined as an efficient arithmetic function over table columns in a SQL where clause. Note, however, that in general, the learning component 204 can employ any supervised machine learning algorithm to develop the thresholds and/or set of evidence.

In one embodiment, once the learning component 204 develops a set of thresholds, the learning component 204 can use the thresholds to perform security incident detection. For example, the learning component 204 can use the thresholds to determine when to elevate a given set of different low confidence security event types (which might otherwise be ignored) to the level of a security incident that should be investigated by a system analyst. Once the learning component 204 detects a given security incident (e.g., based on at least one low confidence security event crossing the thresholds), the justification component 206 provides (as shown in FIG. 4 for example) a list of all security events that occurred during the security incident. The justification component 206 also provides, for each of the security events, a set of evidence. This evidence justifies high-confidence levels coming from obscure events and is used to encourage prompt action by a system analyst. For example, the set of evidence typically represents severe malicious activity and/or suspicious activity that may be of a more threatening nature than the security events that actually occurred during the incident. By reporting the set of evidence to an analyst, the analyst can readily judge whether the incident is real, and whether to take action on the incident.

In one embodiment, the feedback component 208 is configured to receive feedback regarding the analyst's decision (to take or to not take action) in response to a security incident alert. For example, in one embodiment, if the analyst responds to the security incident alert by taking action to resolve the security incident, the response may indicate that the justification component 206 provided the correct set of evidence. In another embodiment, if the analyst responds to the security incident by indicating one or more elements in the evidence set should be modified (e.g., added/deleted/changed), then the response can be used to refine the evidence set based on the analyst's information. In this embodiment, the analyst could be provided with insight as to how the confidence scores were created, which would allow the analyst to provide more nuanced feedback. For example, the analyst could receive information regarding each of the confidence scores, diversity metrics, thresholds, and/or other information that is used to create an evidence set or detect security incidents. Reporting this information can aid the analyst in understanding how the evidence set contributed to the detected security incident, such that the analyst can modify the evidence set to further reduce false positive indications. By removing or adding items to the evidence set directly, the confidence scores would automatically be re-adjusted. In yet another embodiment, if the analyst does not respond to the security incident alert, the non-response still may indicate that the evidence set needs to be refined, as the feedback component 208 can infer the analyst treated the incident as a false positive (e.g., because there was not sufficient enough evidence to cause the analyst to take action).

Accordingly, by constantly adapting and refining the set of evidence and/or security incident detection model based on information from the analyst's behavior, the techniques presented herein can provide increased flexibility, improved accuracy, and reduced amounts of false-positive incidents (e.g., compared to traditional techniques) that can occur during incident detection.

FIG. 3 illustrates an example of the SID tool 134 incorporating analyst feedback, according to one embodiment. As shown in this particular embodiment, the SID tool 134 receives (via the log collection tool 132) a plurality of different logs from security devices, such as firewalls 302, intrusion detection systems 304, antivirus 308 on computing system 306, etc. Each one of the logs may contain several different types of security events, each of which can convey a certain amount of risk associated with a security incident.

Once the SID tool 134 receives the security incidents, the SID tool 134 computes (via confidence score component 202) confidence scores for each security event and evaluates the security events using one or more diversity metrics. The SID tool 134 then uses this information to determine (via the learning component 204, or in some embodiments, via a human analyst) thresholds that can be used to separate known incidents from false positive alert identifications and generate a set of evidence.

Once the SID tool 134 detects a security incident, the SID tool 134 provides (via the justification component 206) a list of security events associated with the detected security incident and the set of evidence that justifies each listed security event to one or more analysts 310. Once the analyst(s) 310 receives the information, the analyst(s) 310 can respond by attempting to resolve the security incident, modify one or more items in the evidence set, mark incidents as false/true positives, or not respond at all. The SID tool 134 monitors the analyst(s) 310 response and can refine the evidence set and/or the thresholds based on the type of response.

Note that although the scenario illustrated in FIG. 3 illustrates the SID tool 134 receiving logs from three different security devices, the techniques presented herein allow the SID tool 134 to receive logs and/or perform security incident detection for any number of devices and for a variety of different types of security events.

FIG. 4 illustrates an example monitoring interface 400 that shows one example of a security incident, according to one embodiment. As shown, the monitoring interface 400 includes a security event list 402 that lists all security events (e.g., nine, in this example) that occurred during the security incident. In the list, each security event is identified by an "Event ID," "Confidence" Score, and a "Signature Name". For example, the "HTTP IIS ISAPI Extension" is a security event that is generally associated with an attempt to exploit a buffer overflow vulnerability. In this particular embodiment, the security event list 402 sorts the security events contributing to the incident in order of decreasing confidence. However, in other embodiments, the security events could be listed in any type of order (e.g., increasing, etc.) and/or arrangement.

The monitoring interface 400 also includes an evidence list 404. The evidence list 404 includes a list of events that most-strongly occurs with the events in the security event list and correlate with successful infections or indicate suspicious activity (e.g., one or more login attempts, repeated password file attempts, etc.). For the sake of clarity, in this particular embodiment, the evidence list 404 includes evidence for only the first security event (e.g., "HTTP IIS ISAPI Extension"). However, note that the evidence list 404 can provide a set of one or more events for each security event that occurs during a given security incident. Each event in the evidence list 404 is identified by an "Event ID", "ConfOccurRate" (Confidence Occurrence Rate), and a "Signature Name." The events that are listed in the evidence list 404 are not events that triggered during the particular security incident, but rather are events that frequently do occur during the same type of security incidents. Reporting this information to an analyst justifies high-confidence levels coming from obscure events. For example, the evidence set usually represents severe malicious activity that may sound more threatening than the incidents that actually occurred during the event. Thus, in this embodiment, presenting an analyst with the "OS Attack" signatures that are affiliated with the "HTTP IIS ISAPI Extension" will improve the likelihood of the analyst taking action to resolve the security incident, as these events represent successful attacks against the OS. Other frequent examples (not shown) include adware in the evidence list that correlate strongly with carrier botnets.

According to an embodiment, reporting evidence from the evidence set in support of the security incident detection also allows the analyst to provide nuanced feedback when false-positive detections arise. In some cases, the analyst can ascribe the false positive to a problem with the evidence set. For example, as mentioned above, the evidence set consists of alerts that can be used to establish confidence scores for security events. Thus, by reporting a list of co-occurring elements of the evidence set, the techniques presented herein allow the analyst to prune elements from the evidence set that are not one hundred percent reliable indicators of infected systems. In general, the existence of alerts in the evidence set that do not belong in the evidence set are one of the dominant causes of false-positive detections and are partly due to conservative alert-diversity thresholds or manual thresholds that are chosen. Thus, eliminating errors in the evidence set can automatically revise confidence scores in these cases, resulting in improved detection accuracy.

In other cases, the analyst can ascribe the false positive to a lack of sufficient evidence. For example, another possible reason for false-positives is that the thresholds over aggregated security event data in the fixed time window for the security event were insufficiently conservative. Thus, with the techniques presented herein, if the evidence provided suggests an infection, but provides insufficient evidence for the conclusion (of an infection), the analyst can mark the security incident as a false positive, resulting in retraining of the security incident detection model and re-selection of a refined boundary between true positives and false positives.

Note that the example monitoring interface 400 illustrates one possible presentation of the information fields for presenting security events and a set of evidence associated with a security incident. For example, in some embodiments, the monitoring interface 400 includes fields, buttons, etc. that allow the user to select (or click) an event in the evidence set to suggest that the event does not belong in the evidence set. In some cases, the monitoring interface 400 includes fields that allow the user to select events that should be included in evidence set or to confirm that events in an evidence set are correct. More generally, one of ordinary skill in the art will recognize that the monitoring interface 400 may include different configurations of the information fields (e.g., with the same or different information) presented to an analyst.

Figure 5:
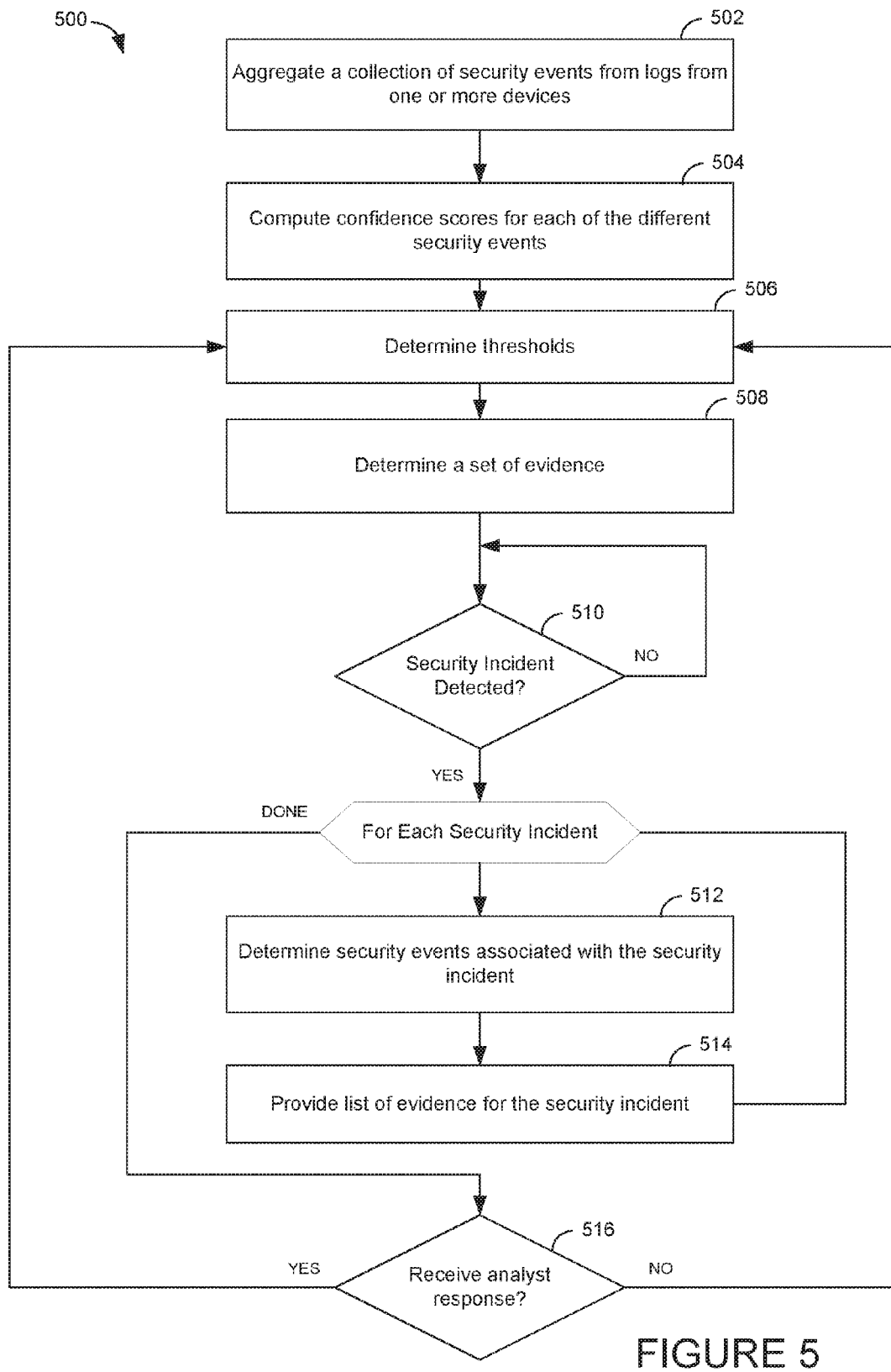
FIG. 5 illustrates a method for detecting security incidents with low confidence security events, according to one embodiment.

FIG. 5 illustrates a method 500 for detecting security incidents with low confidence security events, according to one embodiment. As shown, the method 500 begins at step 502, where the SID tool 134 aggregates a collection of security events received from logs from one or more devices. In one embodiment, the SID tool 134 aggregates the security events for a time period (e.g., on the order of minutes, hours, etc.). In one embodiment, the collection of security events comprises a heterogeneous collection of security events from one or more different devices.

At step 504, the SID tool 134 computes confidence scores for each of the different security events. Each confidence score indicates a likelihood that a security incident has occurred. At step 506, the SID tool 134 determines thresholds for detecting security incidents based, in part, on the confidence scores. For example, as mentioned above, in one embodiment, to determine the thresholds, the SID tool 134 evaluates the security events using one or more diversity metrics and transfers the confidence scores and evaluation data to a human analyst who creates manual thresholds based on the information. In another embodiment, the SID tool 134 inputs the information into a machine learning algorithm in order to generate the thresholds.

At step 508, the SID tool 134 determines a set of evidence (e.g., using the thresholds, analyst feedback, etc.). At step 510, the SID tool 134 determines (e.g., using the thresholds, evidence set, etc.) if a security incident has been detected. If not, the SID tool 134 stays at step 510. If the SID tool 134 does detect (e.g., using the thresholds and the set of evidence) a security incident, then, for each detected security incident, the SID tool 134 provides a list of security events associated with the security incident (step 512) and a list of evidence for each security event to an analyst (step 514). In one embodiment, SID tool 134 also provides a mechanism for the analyst to expose the justification for the confidence score of any individual signature. For example, as mentioned above, the justification of an event's confidence score can include providing the list of security events (e.g., list of evidence) that have been observed to co-occur within a predefined time period (e.g., on the order of minutes, hours, days, etc.) of any instance of the security incident in question. In one particular embodiment, the predefined time period is 24 hours. The list can be sorted by decreasing frequency, and each event in the evidence set can be described by its name (e.g., as shown in FIG. 4). Each event in the evidence set can further be described by the percentage of time the event co-occurred within the time period of the reported security event in question relative to the total number of instances of the (reported) security event that co-occurred with any event in the set of evidence.

At step 516, the SID tool 134 determines whether the analyst has responded to the security incident alert. Whether the analyst responds or does not respond, the SID tool 134 uses the information from the response or lack of the response to update the thresholds (step 506) and evidence set (step 508). In one embodiment, upon receiving an indication that one of the events in the set of evidence does not belong in the evidence set, the SID tool 134 analyzes an estimated effect of removing the indicated event on the reporting of security incidents to the analyst. For example, the SID tool 134 can balance the analyst's recommendation that the event be removed against other previously received or determined information (e.g., thresholds, confidence scores, previous analyst feedback, etc.) to determine whether removal of the event from the evidence set will improve accuracy of the system. In cases where the SID tool 134 determines that the removing the event from the evidence set would decrease the number of incidents that are remediated (e.g., by the analyst) or increase the number of false positive security incidents reported to the analyst, the SID tool 134 may ignore the analyst's recommendation (i.e., not remove the event from the evidence set). In cases where the SID tool 134 determines that removing the event from the evidence set will increase the number of incidents that are remediated or decrease the number of false positive security incidents reported to the analyst, the SID tool 134 may determine to eliminate the event from the evidence set. In this manner, the techniques can be used to provide improved detection of security incidents and reduce the number of false-positive incidents.

Figure 6:
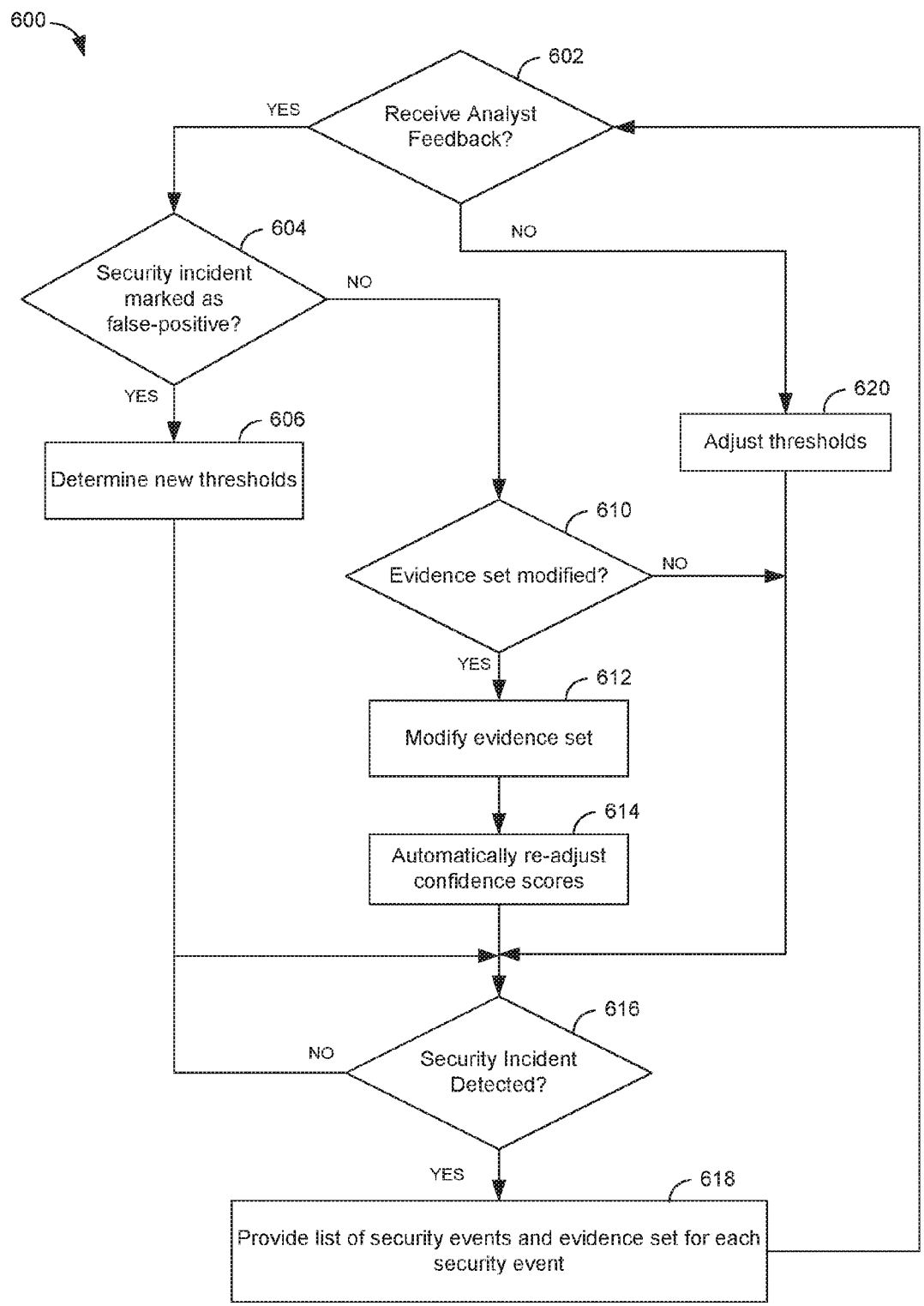
FIG. 6 illustrates a method for using analyst feedback to detect security incidents with low confidence security events, according to one embodiment.

FIG. 6 illustrates a method 600 for incorporating analyst feedback to improve detection of security incidents, according to one embodiment. As shown, the method 600 begins at step 602, where the SID tool 134 determines if analyst feedback has been received. If so, the SID tool 134 next determines, at step 604, if the analyst marked a security incident as false positive. If the SID tool 134 determines that the analyst did mark a security incident as false positive, the SID tool 134, at step 606, determines new thresholds (e.g., using machine learning techniques, etc.).

If, however, the SID tool 134 determines, at step 604, that the analyst did not mark a security incident false positive, the SID tool 134 proceeds to step 610 and determines if the analyst modified (e.g., deleting, adding, etc.) any elements in the evidence set. If so, the SID tool 134, modifies, at step 612, the evidence set (e.g., based on the analyst feedback) and, at step 614, the SID tool 134 automatically re-adjusts the confidence scores (e.g., that were based off elements in the evidence set that did not belong in the evidence set, etc.).

Referring back to step 602, if the SID tool 134 determines, at step 602, that the analyst did not provide feedback, the SID tool 134 may infer that the analyst treated the security incident as a false positive incident and adjusts, at step 620, the thresholds (e.g., using machine learning techniques, etc.). Once the SID tool 134 has performed either steps 606, 614 or 620, the SID tool 134 proceeds to step 616 and determines if another security incident has been detected. If so, the SID tool 134, at step 618, provides a list of security events and evidence set for each security event (e.g., based on the analyst feedback). The SID tool 134 then proceeds to step 602 to determine if the analyst has additional feedback. In this manner, the techniques presented herein are capable of constantly improving the effectiveness of the security incident detection, reducing the number of false positives, etc.

Figure 7:
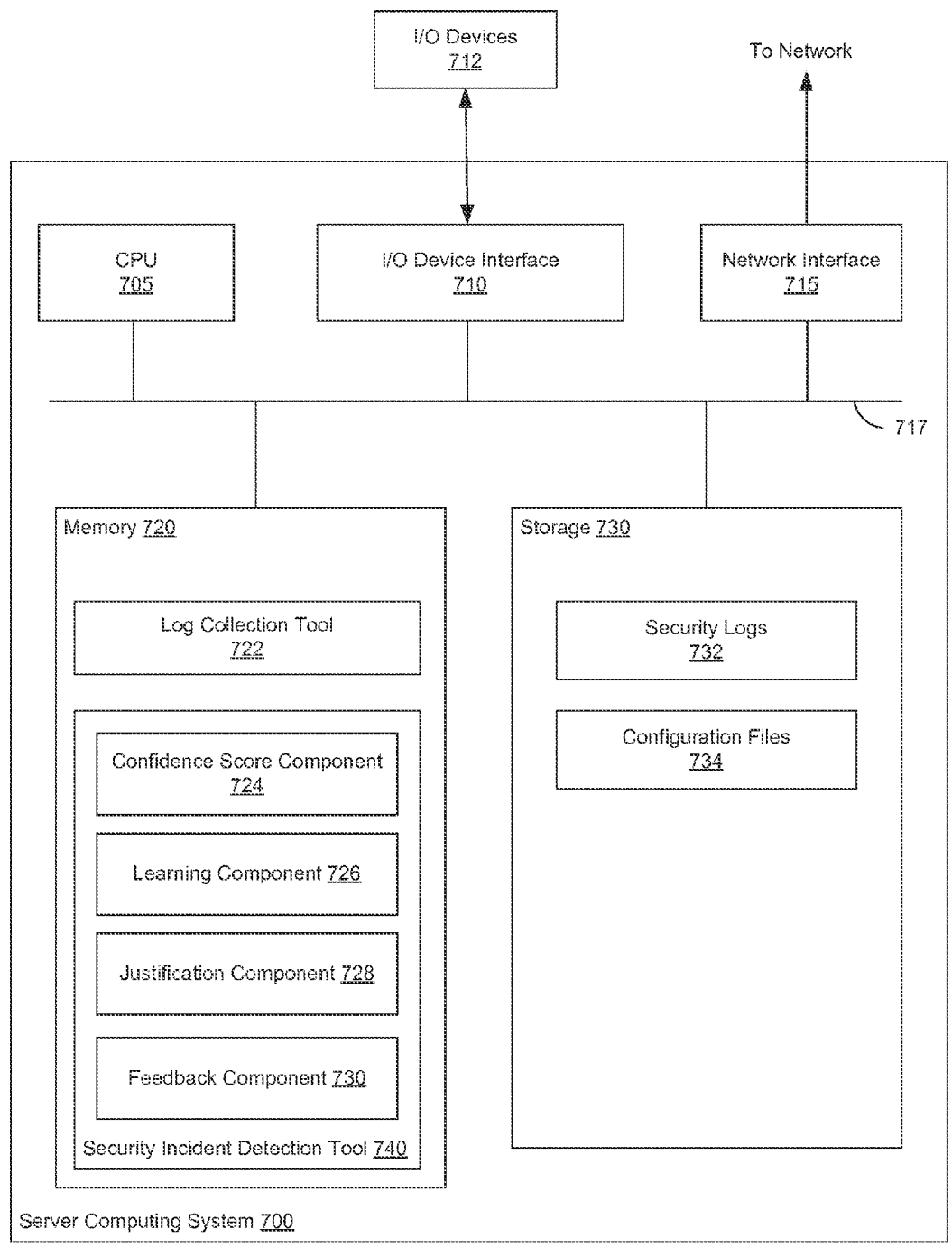
FIG. 7 illustrates an example computing system configured to detect security incidents with low confidence security events, according to one embodiment.

FIG. 7 illustrates an example server computing system 700 configured to perform security incident detection based on low confidence security events, according to one embodiment. As shown, the server computing system 700 includes, without limitation, a central processing unit (CPU) 705, a network interface 715, a memory 720, and storage 730, each connected to a bus 717. The server computing system 700 may also include an I/O device interface 710 connecting I/O devices 712 (e.g., keyboard, display, mouse devices, etc.) to server computing system 700. Further, in context of the present disclosure, the computing elements shown in the server computing system 700 may correspond to a physical computing system (e.g., a system in an enterprise network).

CPU 705 retrieves and executes programming instructions stored in memory 720 as well as stores and retrieves application data residing in the storage 730. The bus 717 is used to transmit programming instructions and application data between CPU 705, I/O devices interface 710, storage 730, network interface 715, and memory 720. Note, CPU 705 is included to be representative of a single CPU, multiple CPUs, a single CPU having multiple processing cores, and the like. Memory 720 is generally included to be representative of a random access memory. Storage 730 may be a disk drive storage device. Storage 730 includes security logs 732 and configuration files 734. Although shown as a single unit, storage 730 may be a combination of fixed and/or removable storage devices, such as fixed disc drives, removable memory cards, or optical storage, network attached storage (NAS), or a storage area-network (SAN).

Illustratively, memory 720 includes a log collection tool 722 and a SID tool 740. The log collection tool 722 collects security logs 732 from several different types involved in security monitoring of a computing network (e.g., an enterprise network). The security logs 732 may contain different types of security events, each of which may convey a certain amount of risk associated with a security incident. Once the SID tool 740 receives the security events, the confidence score component 724 aggregates the security events, computes confidence scores for each security event, and evaluates the confidence scores using one or more diversity metrics. The learning component 726 uses this information to determine thresholds (e.g., via machine learning techniques, manually defined, etc.) that can be used for security incident detection. The learning component can also use the thresholds to determine an initial set of evidence (e.g., if one is not currently available).

In an embodiment, once the SID tool 134 detects a security incident, the justification component 728 provides (to an analyst) a list of security events associated with the detected security incident and the set of evidence that justifies each listed security event. The feedback component 730 monitors the analyst's response, and based on the response, can refine the evidence set and/or the thresholds.

As such, the techniques presented herein allow for improved security incident detection without relying on expert-analyst rules to specify the conditions under which high-confidence events should result in security incidents raised to the analyst (e.g., customer, administrator, user, etc.).

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   aggregating a collection of security events received from logs from one or more devices;
   evaluating the collection of security events based on a confidence score assigned to each distinct type of security event, wherein the confidence score for each distinct type of security event indicates a likelihood that a security incident has occurred;
   determining, based on the confidence scores, at least one threshold for determining when to report an occurrence of a security incident from the collection of security events;
   upon determining that at least a first security event of the collection has crossed the at least one threshold, reporting the occurrence of the security incident to an analyst;
   determining that no response from the analyst regarding the reported occurrence indicates that the security incident is marked false-positive; and
   modifying the at least one threshold after the determination that no response from the analyst indicates the security incident is marked false-positive.

2. The computer-implemented method of claim 1, wherein, upon determining that at least the first security event of the collection has crossed the at least one threshold, the method further comprising:
   generating a set of evidence comprising a list of one or more second security events associated with the first security event to justify the reporting of the occurrence of the security incident to the analyst, wherein the one or more second security events have been observed to co-occur with the first security event within a predefined time period; and
   reporting the first security event and the set of evidence to the analyst.

3. The computer-implemented method of claim 2, further comprising:
   determining information regarding one or more criteria used to generate the set of evidence, wherein the one or more criteria comprises at least one of the confidence scores or one or more metrics used to determine the at least one threshold;
   reporting the information regarding the one or more criteria to the analyst; and
   providing a mechanism that allows the analyst to expose the set of evidence for one or more of the confidence scores.

4. The computer-implemented method of claim 3, wherein the mechanism allows the analyst to select at least one of the one or more second security events to indicate the selected at least one second security event does not belong in the set of evidence.

5. The computer-implemented method of claim 4, wherein upon receiving an indication that one of the one or more second security events does not belong in the set of evidence, the method further comprising:
   analyzing an estimated effect of removing the indicated second security event on the reporting of the occurrence of security incidents to the analyst; and
   determining, based on the analysis, whether to remove the indicated second security event from the set of evidence.

6. The computer-implemented method of claim 5, further comprising removing the indicated second security event from the set of evidence if the analysis indicates at least one of a decrease in a number of false-positive security incidents reported to the analyst or an increase in a number of reported security incidents that are resolved by the analyst.

7. The computer-implemented method of claim 5, further comprising not removing the indicated second security event from the set of evidence if the analysis indicates at least one of an increase in a number of false positive security incidents reported to the analyst or a decrease in a number of reported security incidents that are resolved by the analyst.

8. The computer-implemented method of claim 2, further comprising:
   upon receiving feedback from the analyst, modifying at least one of the at least one threshold or the set of evidence, based on a type of the analyst feedback, wherein the type of analyst feedback indicates at least one of an indication that the security incident is a false-positive, or at least one change in the set of evidence.

9. The computer-implemented method of claim 8, wherein upon determining the type of analyst feedback indicates at least one change in the set of evidence:
   determining the at least one change is based on the one or more criteria used to generate the set of evidence, and wherein modifying at least one of the at least one threshold or the set of evidence comprises automatically re-computing the confidence scores based on the set of evidence comprising the at least one change.

10. The computer-implemented method of claim 2, wherein the list is sorted by decreasing frequency of the one or more second security events, wherein the list further describes each of the one or more second security events by name and describes a percentage of time the one or more second security events co-occurred with the first security event within the predefined time period relative to a total number of occurrences of the first security event with any second security event.

11. The computer-implemented method of claim 2, wherein the one or more second security events indicate at least one of an infection, vulnerability, or attack.

12. A non-transitory computer-readable storage medium storing instructions, which, when executed on a processor, perform an operation, the operation comprising:
   aggregating a collection of security events received from logs from one or more devices;
   evaluating the collection of security events based on a confidence score assigned to each distinct type of security event, wherein the confidence score for each distinct type of security event indicates a likelihood that a security incident has occurred;
   determining, based on the confidence scores, at least one threshold for determining when to report an occurrence of a security incident from the collection of security events;
   upon determining that at least a first security event of the collection has crossed the at least one threshold, reporting the occurrence of the security incident to an analyst;

determining that no response from the analyst regarding the reported occurrence indicates that the security incident is marked false-positive; and modifying the at least one threshold after the determination that no response from the analyst indicates the security incident is marked false-positive.

13. The non-transitory computer-readable storage medium of claim 12, wherein, upon determining that at least the first security event of the collection has crossed the at least one threshold, the operation further comprising:

generating a set of evidence comprising a list of one or more second security events associated with the first security event to justify the reporting of the occurrence of the security incident to the analyst, wherein the one or more second security events have been observed to co-occur with the first security event within a predefined time period; and reporting the first security event and the set of evidence to the analyst.

14. The non-transitory computer-readable storage medium of claim 13, further comprising:

determining information regarding one or more criteria used to generate the set of evidence, wherein the one or more criteria comprises at least one of the confidence scores or one or more metrics used to determine the at least one threshold;

reporting the information regarding the one or more criteria to the analyst; and providing a mechanism that allows the analyst to expose the set of evidence for one or more of the confidence scores.

15. The non-transitory computer-readable storage medium of claim 14, wherein the mechanism allows the analyst to select at least one of the one or more second security events to indicate the selected at least one second security event does not belong in the set of evidence.

16. The non-transitory computer-readable storage medium of claim 15, wherein upon receiving an indication that one of the one or more second security events does not belong in the set of evidence, the method further comprising:

analyzing an estimated effect of removing the indicated second security event on the reporting of the occurrence of security incidents to the analyst; and determining, based on the analysis, whether to remove the indicated second security event from the set of evidence.

17. The non-transitory computer-readable storage medium of claim 16, further comprising removing the indicated second security event from the set of evidence if the analysis indicates at least one of a decrease in a number of false-positive security incidents reported to the analyst or an increase in a number of reported security incidents that are resolved by the analyst.

18. The non-transitory computer-readable storage medium of claim 16, further comprising not removing the indicated second security event from the set of evidence if the analysis indicates at least one of an increase in a number of false positive security incidents reported to the analyst or a decrease in a number of reported security incidents that are resolved by the analyst.

19. A system, comprising:

a processor; and a memory containing a program, which when executed on a processor, performs an operation, the operation comprising:

aggregating a collection of security events received from logs from one or more devices;

evaluating the collection of security events based on a confidence score assigned to each distinct type of security event, wherein the confidence score for each distinct type of security event indicates a likelihood that a security incident has occurred;

determining, based on the confidence scores, at least one threshold for determining when to report an occurrence of a security incident from the collection of security events;

upon determining that at least one security event of the collection has crossed the at least one threshold, reporting the occurrence of the security incident to an analyst;

determining that no response from the analyst regarding the reported occurrence indicates that the security incident is marked false-positive; and modifying the at least one threshold after the determination that no response from the analyst indicates the security incident is marked false-positive.

* * * * *